United States Patent
Richter

(10) Patent No.: US 11,429,658 B1
(45) Date of Patent: Aug. 30, 2022

(54) SYSTEMS AND METHODS FOR CONTENT-AWARE IMAGE STORAGE

(71) Applicant: Soroco Private Limited, London (GB)

(72) Inventor: Wolfgang Richter, Cambridge, MA (US)

(73) Assignee: Soroco Private Limited, London (GB)

( * ) Notice: Subject to any disclaimer, the term of this patent is extended or adjusted under 35 U.S.C. 154(b) by 143 days.

(21) Appl. No.: 16/381,763

(22) Filed: Apr. 11, 2019

Related U.S. Application Data

(60) Provisional application No. 62/656,056, filed on Apr. 11, 2018.

(51) Int. Cl.
| | | |
|---|---|---|
| *G06F 16/483* | (2019.01) | |
| *G06F 16/48* | (2019.01) | |
| *G06F 16/41* | (2019.01) | |
| *G06K 9/62* | (2022.01) | |

(52) U.S. Cl.
CPC ............ *G06F 16/483* (2019.01); *G06F 16/41* (2019.01); *G06F 16/489* (2019.01); *G06K 9/6215* (2013.01)

(58) Field of Classification Search
CPC ...... G06F 16/41; G06F 16/2246; G06F 16/45; G06F 16/583; G06F 16/48; G06F 16/483; G06F 16/489; G06K 9/6215
USPC ........................................................ 707/741
See application file for complete search history.

(56) References Cited

U.S. PATENT DOCUMENTS

| | | | | |
|---|---|---|---|---|
| 9,053,562 B1 * | 6/2015 | Rabin | .................... | G06V 10/89 |
| 9,111,160 B1 * | 8/2015 | Baskaran | ................ | H04L 67/22 |
| 9,185,175 B1 * | 11/2015 | Sharma | .................. | H04L 43/10 |
| 9,324,161 B2 | 4/2016 | Zund et al. | | |
| 10,097,650 B2 * | 10/2018 | Sharma | .................. | H04L 43/14 |
| 2008/0222295 A1 * | 9/2008 | Robinson | ............... | G06Q 10/10 |
| | | | | 709/227 |
| 2012/0274846 A1 * | 11/2012 | Kimura | .............. | H04N 1/00198 |
| | | | | 348/441 |
| 2015/0341652 A1 * | 11/2015 | Sun | ........................ | H04N 19/61 |
| | | | | 382/233 |
| 2017/0064309 A1 * | 3/2017 | Sethuraman | ......... | H04N 19/127 |
| 2017/0351922 A1 * | 12/2017 | Campbell | .......... | H04N 21/4335 |
| 2017/0352083 A1 * | 12/2017 | Ruck | .................. | G06Q 30/0621 |
| 2018/0046649 A1 * | 2/2018 | Dal Mutto | .............. | G06F 16/41 |
| 2020/0302658 A1 * | 9/2020 | Simon | .................... | H04N 19/88 |

(Continued)

OTHER PUBLICATIONS

[No Author Listed], A new image format for the Web. WebP. Feb. 11, 2019. https://developers.google.com/speed/webp/ (last accessed Apr. 11, 2019). 1 page.

(Continued)

*Primary Examiner* — Dangelino N Gortayo

(74) *Attorney, Agent, or Firm* — Wolf, Greenfield & Sacks, P.C.

(57) ABSTRACT

The techniques described herein relate to methods, apparatus, and computer readable media for content-aware image storage. A set of images is accessed from a storage device, each image of the set of images containing at least a part of a screenshot of a display of a computing device used by a user. The set of images is sorted using a similarity metric to obtain a sorted set of images. The sorted set of images are encoded using a video codec to obtain a video encoding the sorted set of images. The video is stored in conjunction with metadata indicating a correspondence between images in the set of images and frames in the video.

20 Claims, 7 Drawing Sheets

(56) References Cited

U.S. PATENT DOCUMENTS

2020/0387533 A1* 12/2020 Nolte .................... G06F 40/279
2021/0004737 A1* 1/2021 Brians ................... G06Q 40/00

OTHER PUBLICATIONS

[No Author Listed], HEIF Image Container Format Leverages H.265/HEVC to Store Photos and Image Sequences. CNXSOFT. Mar. 17, 2018. https://www.cnx-software.com/2018/03/17/heif-image-container-format-leverages-h-265-hevc-to-store-photos-and-image-sequences/ (last accessed Apr. 11, 2019). 3 pages.

[No Author Listed], High Efficiency Image File Format. Wikipedia. Apr. 5, 2019. https://en.wikipedia.org/wiki/High_Efficiency_Image_File_Format (last accessed Apr. 11, 2019). 2 pages.

Gardiner et al., If I use still images in a video will it compress to be a much smaller file size? Quora. Sep. 19, 2013. https://www.quora.com/If-I-use-still-images-in-a-video-will-it-compress-to-be-a-much-smaller-file-size (last accessed Apr. 11, 2019). 2 pages.

* cited by examiner

SYSTEMS AND METHODS FOR CONTENT-AWARE IMAGE STORAGE

CROSS-REFERENCE TO RELATED APPLICATIONS

This application claims the benefit under 35 U.S.C. § 119(e) of U.S. Provisional Application Ser. No. 62/656,056, entitled "CONTENT-AWARE DISTRIBUTED IMAGE STORAGE" filed on Apr. 11, 2018, which is herein incorporated by reference in its entirety.

BACKGROUND

Many company employees spend a large portion of their time working on computers. An employer may monitor an employee's computer activity by installing a monitoring application program on the employee's work computer to monitor the employee's actions. For example, an employer may install a keystroke logger application on the employee's work computer. The keystroke logger application may be used to capture the employee's keystrokes and store the captured keystrokes in a text file for subsequent analysis. Other applications for monitoring computer activity may periodically pose questions to the employee regarding their current activity. For example, the application may ask the employee "what are you doing?" and subsequently ask "are you still doing this?" Still other applications for monitoring computer activity, such as screen scraping applications, may periodically generate screen captures of a portion of (or all of) the computer screen to capture an employee's computer interactions for subsequent analysis. Such screen scraping applications can generate a significant number of images for each employee and/or computing device over time.

SUMMARY

According to at least one aspect, at least one computer readable storage medium is provided. The at least one computer readable storage medium stores processor-executable instructions that, when executed by at least one processor, cause the at least one processor to perform: accessing, from a storage device, a set of images, each image of the set of images containing at least a part of a screenshot of a display of a computing device used by a user; sorting the set of images using a similarity metric to obtain a sorted set of images; encoding the sorted set of images using a video codec to obtain a video encoding the sorted set of images; and storing the video in conjunction with metadata indicating a correspondence between images in the set of images and frames in the video.

In some embodiments, the at least one computer readable storage medium is further configured to cause the at least one processor to access, from the storage device, a second set of images, each of the images in the second set of images containing at least a part of a screenshot of a second display of a second computing device used by a second user, wherein the sorting includes sorting a union of the set of images and the second set of images to obtain the sorted set of images.

In some embodiments, each image in the set of images is stored in an associated image file having an identifier indicating a time at which the image was captured.

In some embodiments, sorting the set of images includes determining, using a membership metric, a first set of images and a second set of images from the set of images, sorting the first set of images using the similarity metric into a first sorted set of images, and sorting the second set of images using the similarity metric into a second sorted set of images; and encoding the sorted set of images includes encoding the first sorted set of images using the video codec to obtain a first video encoding the first sorted set of images, and encoding the second sorted set of images using the video codec to obtain a second video encoding the second sorted set of images.

In some embodiments, determining the first set of sorted images and the second set of sorted images using the membership metric includes determining the first set of sorted images and the second set of sorted images based on a) the similarity metric, b) a file name of each image in the set of images, or both.

In some embodiments, sorting the set of images includes generating, for each image of the set of images, a fingerprint using a perceptual hash algorithm, and sorting the set of images based on the fingerprint of each image.

In some embodiments, the metadata includes, for each image in the set of images, information indicating an association between a file name of the image and a frame in the video.

In some embodiments, the processor-executable instructions further cause the at least one processor to generate the metadata.

In some embodiments, the processor-executable instructions further cause the at least one processor to receive a request to access an image encoded in the video, determine, based on the metadata, a location in the video associated with the requested image, and extract, from one or more frames at the location in the video, the requested image.

In some embodiments, receiving the request includes receiving a file name of the image, a timestamp associated with the image, or some combination thereof.

In some embodiments, extracting includes loading an initial portion of the video to initialize the video codec for the video, loading the one or more frames at the location in the video, and decoding, using the video codec, the requested image based on the loaded one or more frames.

According to at least one aspect, a system is provided. The system includes at least one hardware processor and at least one non-transitory computer-readable storage medium storing processor-executable instructions that, when executed by the at least one hardware processor, cause the at least one hardware processor to perform: accessing, from a storage device, a set of images, each image of the set of images containing at least a part of a screenshot of a display of a computing device used by a user; sorting the set of images using a similarity metric to obtain a sorted set of images; encoding the sorted set of images using a video codec to obtain a video encoding the sorted set of images; and storing the video in conjunction with metadata indicating a correspondence between images in the set of images and frames in the video.

In some embodiments, the processor-executable instructions further cause the at least one hardware processor to access, from the storage device, a second set of images, each of the images in the second set of images containing at least a part of a screenshot of a second display of a second computing device used by a second user, wherein the sorting includes sorting a union of the set of images and the second set of images to obtain the sorted set of images.

In some embodiments, each image in the set of images is stored in an associated image file having an identifier indicating a time at which the image was captured.

In some embodiments, sorting the set of images includes determining, using a membership metric, a first set of images and a second set of images from the set of images, sorting the first set of images using the similarity metric into a first sorted set of images, and sorting the second set of images using the similarity metric into a second sorted set of images; and encoding the sorted set of images includes encoding the first sorted set of images using the video codec to obtain a first video encoding the first sorted set of images, and encoding the second sorted set of images using the video codec to obtain a second video encoding the second sorted set of images.

In some embodiments, determining the first set of sorted images and the second set of sorted images using the membership metric includes determining the first set of sorted images and the second set of sorted images based on a) the similarity metric, b) a file name of each image in the set of images, or both.

In some embodiments, sorting the set of images includes generating, for each image of the set of images, a fingerprint using a perceptual hash algorithm, and sorting the set of images based on the fingerprint of each image.

In some embodiments, the metadata includes, for each image in the set of images, information indicating an association between a file name of the image and a frame in the video.

In some embodiments, the processor-executable instructions further cause the at least one processor to receive a request to access an image encoded in the video, determine, based on the metadata, a location in the video associated with the requested image, and extract, from one or more frames at the location in the video, the requested image.

According to at least one aspect, a method is provided. The method is performed by a computing device, the method including: accessing, from a storage device, a set of images, each image of the set of images containing at least a part of a screenshot of a display of a computing device used by a user; sorting the set of images using a similarity metric to obtain a sorted set of images; encoding the sorted set of images using a video codec to obtain a video encoding the sorted set of images; and storing the video in conjunction with metadata indicating a correspondence between images in the set of images and frames in the video.

According to at least one aspect, at least one computer readable storage medium is provided. The at least one computer readable storage medium stores processor-executable instructions that, when executed by at least one processor, cause the at least one processor to perform: accessing a set of images from a storage device; sorting the set of images using a similarity metric to obtain a sorted set of images; encoding the sorted set of images using a video codec to obtain a video encoding the sorted set of images; and storing the video in conjunction with metadata indicating a correspondence between images in the set of images and frames in the video. In some embodiments, each image of the set of images may include at least a part of a screenshot of a display of a computing device used by a user.

According to at least one aspect, a system is provided. The system includes at least one hardware processor and at least one non-transitory computer-readable storage medium storing processor-executable instructions that, when executed by the at least one hardware processor, cause the at least one hardware processor to perform: accessing a set of images from a storage device; sorting the set of images using a similarity metric to obtain a sorted set of images; encoding the sorted set of images using a video codec to obtain a video encoding the sorted set of images; and storing the video in conjunction with metadata indicating a correspondence between images in the set of images and frames in the video.

In some embodiments, each image of the set of images may include at least a part of a screenshot of a display of a computing device used by a user.

According to at least one aspect, a method is provided. The method is performed by a computing device, the method including: accessing a set of images from a storage device; sorting the set of images using a similarity metric to obtain a sorted set of images; encoding the sorted set of images using a video codec to obtain a video encoding the sorted set of images; and storing the video in conjunction with metadata indicating a correspondence between images in the set of images and frames in the video. In some embodiments, each image of the set of images may include at least a part of a screenshot of a display of a computing device used by a user.

It should be appreciated that all combinations of the foregoing concepts and additional concepts described in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1:
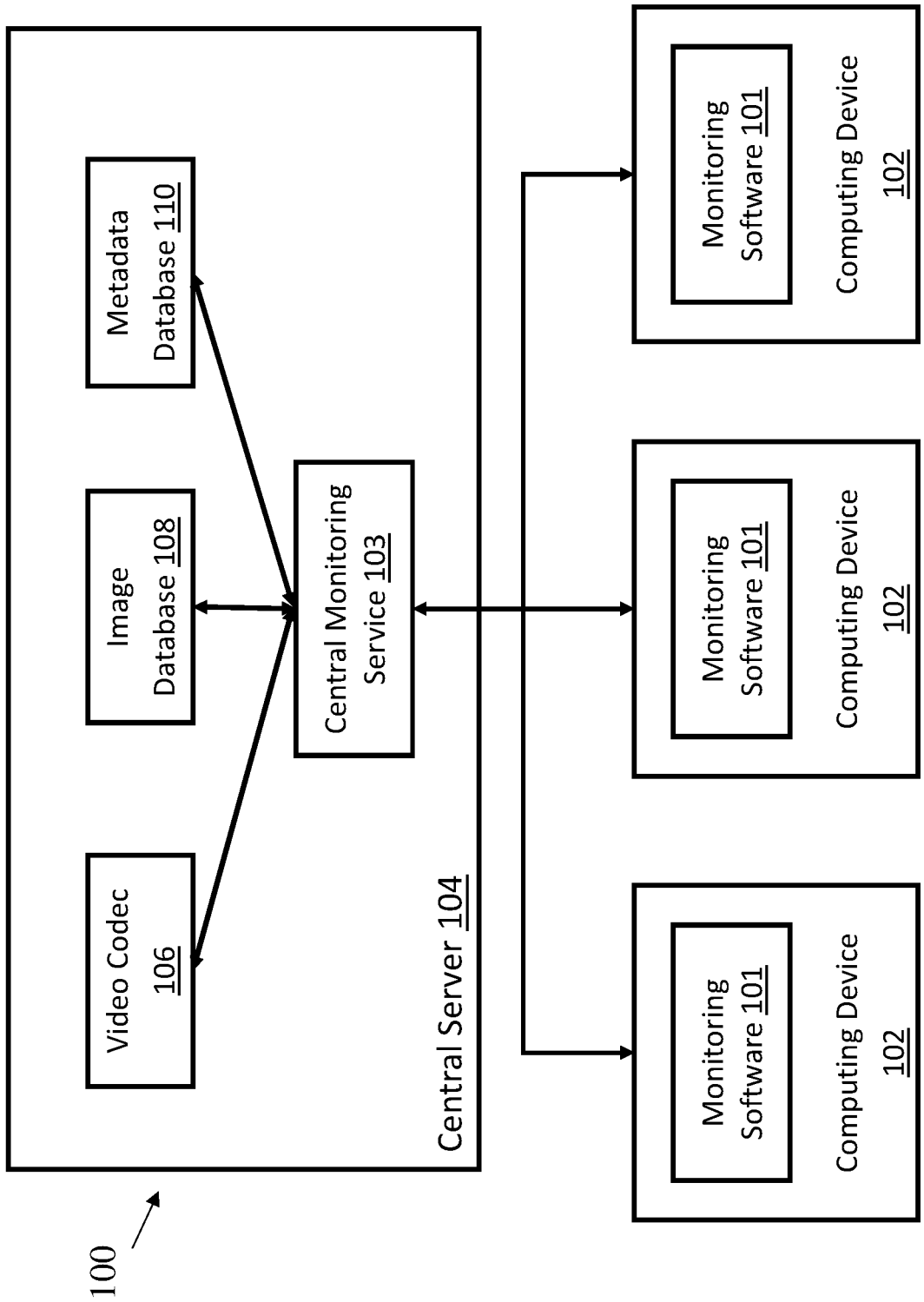
FIG. 1 is a diagram showing an exemplary task tracking system, according to some embodiments of the technology described herein.

The inventors have recognized and appreciated that processing large sets of images, including ingesting, storing, and/or performing data analytics on such images (e.g., using computer vision techniques) can present several challenges to existing systems. For example, each image is typically stored as a separate file, which can result in the system storing large numbers of small files. Since each file typically requires associated metadata, storing large numbers of small files can incur significantly more file system metadata overhead compared to using fewer, larger files. Such metadata overhead can waste storage space that could otherwise be used to store images for analysis, increase the amount of time needed to retrieve files due to the time it can take to traverse the various directories containing many files, and/or can cause other performance issues. For example, file systems storing large numbers of files typically need to load large quantities of directory metadata before finding a file.

The inventors have also recognized and appreciated that the amount of storage required for image storage applications over time can grow rapidly, since large numbers of images are typically added daily but are not easily compressible (e.g., without compromising the actual pixel data). The inventors have also discovered and appreciated that compressing images individually ignores opportunities for inter-image deduplication. For example, as described herein, screen scraping applications may generate images with some relation and/or overlap of content. For example, successive screenshots of the same application window may share similar data, including for static portions of the window of the application, including the border, title bar, background, menu bar, etc. However, compressing each image separately does not leverage further compression that can be achieved when leveraging redundancy across the overall dataset (e.g., by de-duplicating pixel data in related images). For example, the inventors have discovered that deduplication across images can save significantly more space than individually compressing each image, without compromising the perceptual integrity of the individual images.

The inventors have also recognized and appreciated that conventional image storage systems, such as distributed image stores, often have little or no control over when content is received for storage and/or requested for access. For example, image stores may need to access (e.g., read or write) images at arbitrary points in time, and in an arbitrary order. Accessing images in an arbitrary, or near-random, order makes it impractical if not impossible for modern computers to leverage similar images for compression (e.g., such as deduplicating pixels over a set of images and/or the entire dataset). It can be desirable for image storage systems to retrieve requested images quickly (e.g., to avoid slowing down or impacting other workloads or processes downstream from image retrieval). While compressing images can be beneficial from a data usage standpoint, compressing images (e.g., using techniques such as deduplicating pixels) can slow down image retrieval. Therefore, conventional image storage systems require significant resources to store large numbers of images. Such storage can unnecessarily waste significant amounts of storage space since current image storage systems store and process images separately from other images in the store. For example, conventional storage systems store hundreds of millions of images, which wastes significant amounts of disk space on metadata for indexing the images. Such large image datasets frequently consume petabytes to exabytes of data storage per year, making it very expensive to implement image storage techniques for applications that require handling large numbers of images.

Accordingly, the inventors have conceived and developed new technology that improves upon conventional image storage and retrieval technology. This new technology improves conventional image storage and retrieval technology (which is a computer-related technology) by reducing the amount of storage space needed to store a set of images and/or by reducing the amount of time need to retrieve previously stored images. In some embodiments, the techniques developed by the inventors involve storing a set of images by: (1) sorting the set images (e.g., using a similarity metric) to generate a sorted set of images with similar images located near each other; (2) compressing the sorted set of images using video encoding techniques (e.g., using a video codec) to generate a video (e.g., video data and/or a video file); and (3) storing, in a data store, the video along with metadata indicating the correspondence between images in the set of images and frames in the video. In this way, images are stored as part of a video obtained using video encoding techniques, which serves to compress the set of images by leveraging similarities among neighboring and/or nearby images. The techniques can include generating, storing, and/or maintaining metadata for each image, including requisite metadata to locate and retrieve the image from video data (e.g., for a retrieval process).

In some embodiments, garbage collection techniques can be used to delete images. Metadata can be set and/or updated for each image and/or sets of images to mark the images for deletion. A batch garbage collection process can be run periodically to delete some or all of the images marked for deletion (e.g., depending on whether the garbage collection process is allocated sufficient run-time to delete all of the marked images). For video data that includes one or more images marked for deletion, the garbage collection process can create a new video that does not include the images marked for deletion, and delete the original video.

Accordingly, aspects of the present disclosure relate to technical improvements to conventional image storage and retrieval technology, which achieves significant storage savings, and facilitates fast image retrieval. In some embodiments, sorting and combining images into a video achieves two to three orders of magnitude, or more, of space savings compared to existing image storage techniques. For example, if a system collects a terabyte of data per week (e.g., for each one hundred users), the terabyte of data can be compressed to 100 gigabytes, or even further (e.g., ~10 gigabytes). The techniques developed by the inventors therefore result in significant storage savings through compression and pixel deduplication achieved through the video encoding algorithms.

The techniques support various image processing scenarios, including providing easy, bandwidth-efficient, cluster-based computer vision applications. The techniques provide quick, single-read image retrieval from compressed video containers. The techniques are scalable to large numbers of image operations (e.g., hundreds of thousands per second), including insertion and retrieval operations. The techniques can encrypt the images and/or videos to protect the data, including to prevent leaking sensitive user information stored within image pixel data. For example, the Advanced Encryption Standard (AES) can be used for encryption, as described herein. The techniques can sort images at various stages, including during insertion, based on collections of images, and/or groups of collections of images.

As described further herein, the techniques developed by the inventors can be configured to support batch-style and/or real-time image processes. For example, batch processes can be run to cluster and/or sort images for compression, including via machine learning techniques (e.g., including unsupervised machine learning and/or other machine learning algorithms). As another example, batch processes can be configured to perform machine vision tasks on images, such as performing optical character recognition, edge detection, and/or other computer vision tasks. Real-time processes can be used to perform user-initiated image requests, retrieval, rendering, and/or the like (e.g., via an interface to the image storage system, such as through a web browser). As another example, real-time processes can be used to insert and/or store new images (e.g., via an application programming interface (API) to the system, such as via a representational state transfer (REST) API).

The techniques can be used to provide image storage for various types of application scenarios, including scenarios otherwise unable to provide image storage using prior techniques due to limited storage capabilities. For example, while cloud storage can be used to provide large amounts of storage, cloud storage may not be available for certain applications. For example, data may be required to be kept in secure locations (e.g., within a company's intranet), such as for regulatory reasons. As another example, without reducing the size of the data stored, the speed of machine learning algorithms can be limited due to the bandwidth required to pull large amounts of data from disk. By using less storage, machine learning algorithms can be improved using the techniques disclosed herein, since fewer disk accesses are required to read data from disk.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

In some embodiments, images may be captured by software (e.g., one or more computer programs) for monitoring user interaction with a computing device (which may generally be referred to herein as monitoring software). In some embodiments, the monitoring software may be installed on a computing device to track user interaction with the computing device. The computing device may include various input/output devices to facilitate user interaction with the computing device such as a display to present a user interface, a mouse or touch screen to navigate the user interface, and/or a keyboard to enter characters into the user interface. The computing device may include at least one non-transitory computer-readable storage medium that stores the monitoring software and at least one hardware processor that may execute instructions part of the monitoring software stored in the at least one non-transitory computer-readable storage medium. The instructions in the monitoring software may cause the hardware processor to perform various functions to capture information indicative of a user's interaction with the computing device such as clicks (e.g., mouse clicks, taps on a touch screen, etc.) and keystrokes in addition to contextual information regarding each user action such as a state of the user interface.

In some embodiments, the monitoring software may receive an indication of an action being performed by a user on the system. In such embodiments, the monitoring software may cause (e.g., indirectly or directly) the computing device to capture computer usage data. For example, the monitoring software may collect information indicative of a particular action performed (e.g., a click or a keystroke) and contextual information regarding a state of the user interface (e.g., a state of the active application in the user interface). For example, the monitoring software may capture a screenshot of all or a portion of the user interface and/or gather contextual information associated with the action or actions that triggered acquisition of the screenshot. For example, the monitoring software can capture a screenshot of the entire user interface, a screenshot of the active window in the user interface, a set of interfaces in the user interface, and/or other portions of the user interface (e.g., the task bar of the computing device, a title bar of the active window, etc.). The monitoring software can be configured to capture a sequence of images for each action in order to capture sufficient information to analyze the user's interactions with the computing device. The contextual information can include, for example, information regarding a state of an active application, a title in a title bar of the active application, a value in at least one field of the active application, a size of a window of the active application, a location of the window of the active application, a document object model (DOM) for an active document, and/or other related contextual information useful for subsequent analysis.

The monitoring software may intercept user actions through any of a variety of methods. In some embodiments, the monitoring software may use hooks such as those available through the WINDOWS Automation API in the WINDOWS operating systems. These hooks may be, for example, points in the system message-handling mechanism where an application can install a subroutine to monitor the message traffic in the system and process certain types of messages before they reach the target window procedure. For example, the monitoring software may install a hook in the operating system to call one or more functions when an action is detected to gather the appropriate contextual information. Once the functions have gathered the appropriate contextual information, the monitoring software may allow the operating system to provide the action to the target application and cause the user interface to update.

The computer usage data collected by the monitoring software may include various patterns that may be extracted to identify one or more tasks being performed by a user on the computing device from which the computer usage data is gathered. For example, a user may switch between using a web browser and an integrated development environment application, which may indicate that the user is developing software.

In some embodiments, computer software can be used to gather and process the computer usage data generated by instances of the monitoring software running on computing devices to identify automatable tasks (referred to generally herein as the central monitoring service). For example, the central monitoring service may be implemented as a network application that is accessible over a network, such as an intranet or the Internet, and is executed by at least one server. The server may include, for example, a communication interface to communicate with one or more computing devices running instances of the monitoring software. The central monitoring service may receive computing usage information from instances of the monitoring software running on computing devices and also push software updates to these monitoring software instances. The server(s) may further include at least one non-transitory computer-readable storage medium storing the central monitoring service and one or more hardware processors that may execute the instructions from the central monitoring service stored in the non-transitory computer-readable storage medium or media. The instructions in the central monitoring service may cause the hardware processor(s) to perform various functions to gather and analyze computer usage data to identify automatable tasks.

In some embodiments, the central monitoring service may receive, via the communication interface, data for a plurality of events from at least one computing device running the monitoring software. Each of the plurality of events may include information indicative of an action a performed by a user on the respective computing device (e.g., an input to the computing device performed by the user such as a click and a keystroke) and contextual information associated with the action performed by the user. For example, the received data can include a series of screenshots, as described herein.

In some embodiments, the central monitoring service may analyze the data for a plurality of events to identify one or more tasks being performed by the user. A task may be, for example, a sequence of one or more user interactions with a computing device across one or more applications programs that culminates in an objective being completed. Non-limiting examples of objectives include resetting a password, creating a purchase order, processing payroll, and creating a document. When a user uses multiple application programs to perform a single task, the task may be considered as being composed of multiple sub-tasks, each of the multiple sub-tasks comprising actions performed by using a respective one of the multiple application programs. Thereby, sub-tasks may, in some embodiments, involve user interaction with only a single software application. For example, a user may interact with a computing device to create a legal document by performing a first sub-task of using a web-browser to perform legal research and a second sub-task of using a word processing software application to generate the text of the legal document. Some tasks, however, may involve only a single software application on the computing device. For example, a user may interact with a computing device to process payroll for a company and only use an accounting software application to process the payroll.

FIG. 1 shows an exemplary task tracking system 100, according to some embodiments. The task tracking system 100 is suitable to track the tasks being performed by users on a plurality of computing devices 102. Each of the computing devices 102 may comprise a memory (e.g., volatile memory and/or a non-volatile memory), a processor, and execute instructions stored on the memory to provide an instance of monitoring software 101 that tracks user interaction with the respective computing device 102 (e.g., including generating screen captures of each computing device 102). Monitoring software 101 may be, for example, implemented as a software application and installed on an operating system, such as the WINDOWS operating system, running on the computing device 102. In another example, Monitoring Software 101 may be integrated into the operating system running on the computing device 102. As shown in FIG. 1, the tracking system 100 further includes a central server 104 that may be a computing device, such as a server and/or distributed set of servers, including a video encoding/decoding algorithm (video codec) 106, an image database 108, and a metadata database 110. The central server 104 may execute an instance of central monitoring service 103 that gathers the computer usage information collected from the instances of monitoring software 101 (e.g., including the screen captures) and stores the collected information in the image database 108. In some embodiments, central monitoring service 103 may include services to provide access to the stored computer usage information in the database 110. Central monitoring service 103 may be implemented in any of a variety of ways including, for example, as a web-application.

In some embodiments, monitoring software 101 may monitor the particular tasks being performed on the computing device 102 on which it is running. For example, monitoring software 101 may monitor the task being performed by monitoring keystrokes and/or clicks and gathering contextual information associated with each keystroke and/or click. The contextual information may include a series of one or more screen captures of the user interface (or portions of the user interface) and/or other information indicative of the state of the user interface when the keystroke and/or click occurred. For example, the contextual information may include information regarding a time the screen capture was taken, a state of the user interface such as the name of the particular application that the user interacted with, the particular button or field that the user interacted with, and/or the uniform resource locator (URL) link in an active web-browser. The contextual information may be leveraged to gain insight regarding the particular task that the user is performing. For example, a software developer may be using the computing device 102 develop source code and be continuously switching between an application suitable for developing source code and a web-browser to locate code snippets. Unlike traditional keystroke loggers that would merely gather a string of depressed keys including bits of source code and web URLs, monitoring software 101 may advantageously gather useful contextual information such as images of the source code development, the websites open in the web browser, and/or the particular active application associated with each keystroke. Thereby, the task of developing source code may be more readily identified in the collected data by analyzing the captured screenshots (e.g., including screenshots of the active application(s) and/or associated contextual information).

The data collection processes performed by monitoring software 101 may be seamless to a user of the computing device 102. For example, monitoring software 101 may gather the computer usage data without introducing a perceivable lag to the user between when an action is performed and when the user interface is updated. Monitoring software 101 may automatically store the collected computer usage data. In some embodiments, monitoring software 101 can store the collected computer usage data in memory (e.g., in volatile memory) and transfer portions of the collected computer usage data from the memory to storage (e.g., non-volatile memory). Thereby, monitoring software 101 may upload captured information to central monitoring server 103. In some embodiments, monitoring software 101 may transfer collected computer usage data to central monitoring server 103 periodically, aperiodically, according to a pre-defined schedule, and/or the like. Accordingly, the monitoring software may be completely unobtrusive on the user experience at computing device 102.

As described above, the inventors have discovered and appreciated that the monitoring software 101 and/or other types of screen scraping applications generate large volumes of images and potentially other accompanying computer usage data. For example, thousands of screenshots may be captured and/or generated for each user on a daily basis to attempt to capture a lot of interaction points for each triggering action. The images may be high resolution images, such as images captured at full screen size. Such large numbers of screenshots may consume significant storage resources, including on both the monitored computing devices and at a central server, as well as processing resources (e.g., to capture the images and analyze the images). While fewer images could be captured to save resources, it could result in capturing insufficient contextual data for an event in order to meaningfully process the data.

Accordingly some embodiments provide for techniques for sorting and combining individual images into a video stream using a video codec. Combining the images using a video codec may result in improved compression and de-duplication of the image data than, for example, compressing each individual image in isolation. Some embodiments further provide for maintaining metadata for each image to allow for fast retrieval of images once compressed into a video.

Referring to FIG. 1, the central server 104 includes an image database 108, which the central monitoring service 103 uses to store images and other contextual information received from the various monitoring software 101 applications running on the computing devices 102. The central server 104 also includes a metadata database 110, which the central server 104 uses to store metadata, including metadata for the images stored in the image database 108. While the image database 108 and the metadata database 110 are shown as separate databases, this is for exemplary purposes only; just one database and/or a plurality of additional databases could be used to implement the storage needed by the central server 104. For example, in some embodiments the image database 108 and/or the metadata database 110 are distributed data stores, such as distributed blob stores. The central server 104 can also include a video codec 106 that the central server 104 uses to encode and/or decode images into videos, as described further herein.

Figure 7:
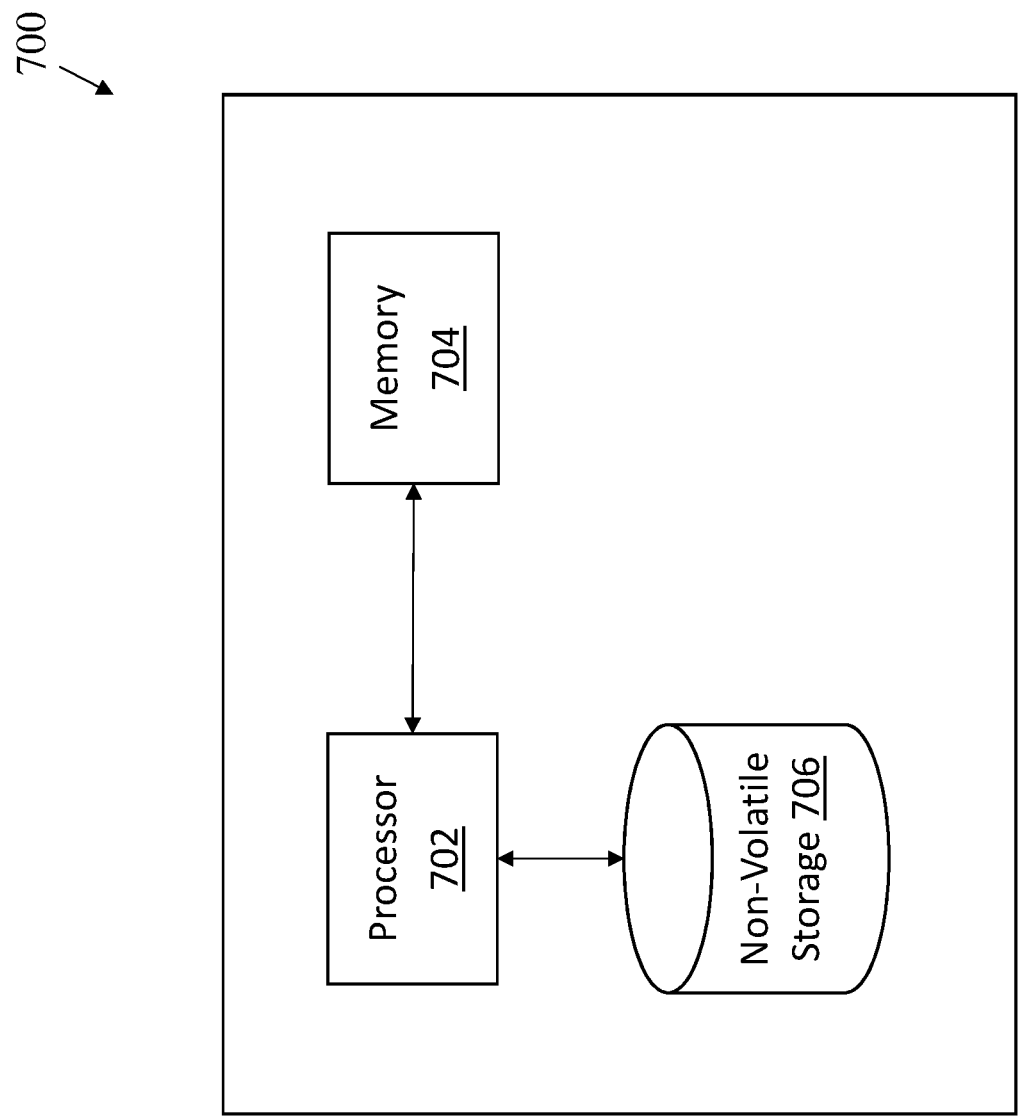
FIG. 7 is a block diagram of an exemplary computer system, according to some embodiments of the technology described herein.

In some embodiments, the computing devices 102 and/or the central server 104 can be implemented using the computer system 700 described in conjunction with FIG. 7. As shown in FIG. 1, the computing devices 102 are in communication with the central server 104. Each of the computing devices 102 can be connected to the central server 104 using a network such as a local area network (LAN), a wide area network (WAN), a company Intranet, the Internet, a combination of one or more such networks, and/or any other type of network connection or connections. The computing devices 102 and the central server 104 can be located at the same location or at one or more different locations. For example, all of the computing devices 102 and the central server 104 can be located on premise at a company, and connected through a company Intranet. As another example, one or more of the computing devices 102 and central server 104 can be located at different company locations and connected through a secure company network, such as by using a virtual private network (VPN). As a further example, the computing devices 102 can be located at one or more company locations, and the central server 104 can be located at a remote location that is not a part of the company (e.g., at the location of a separate company providing a monitoring service).

Figure 2:
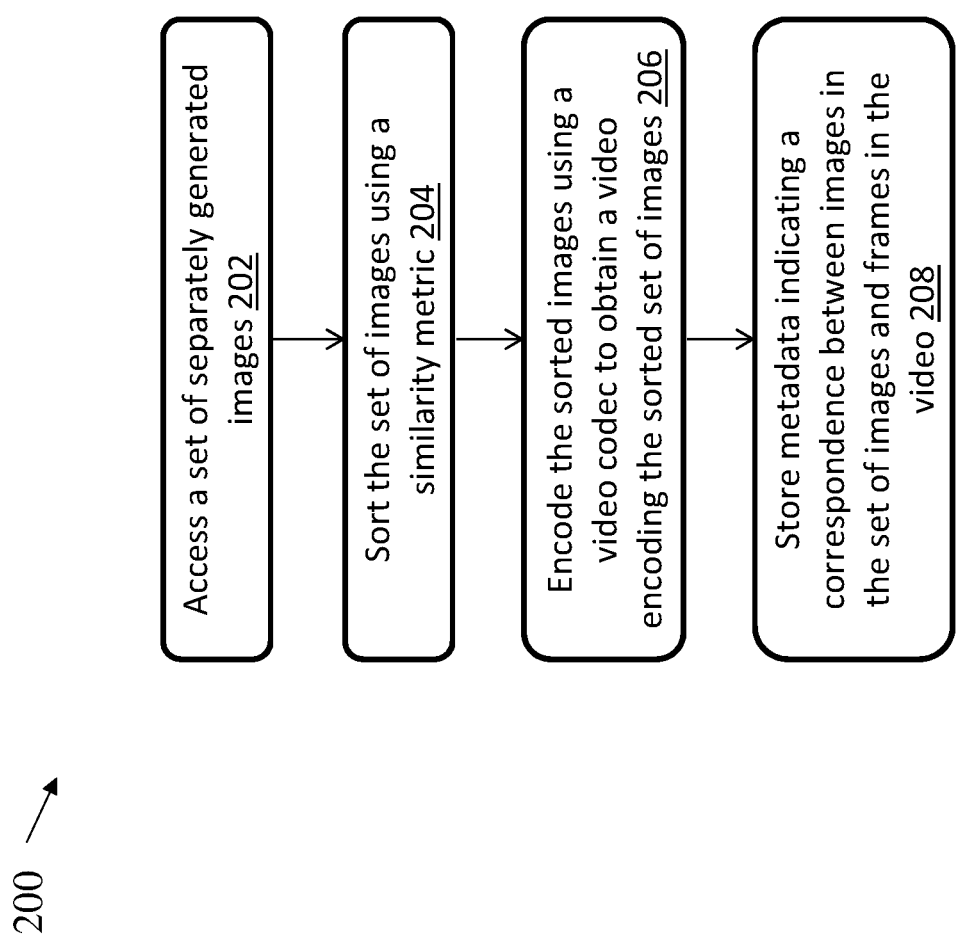
FIG. 2 shows an exemplary computerized process for encoding a set of images into a video, according to some embodiments of the technology described herein.

FIG. 2 is an exemplary computerized method 200 for encoding a set of images into a video, according to some embodiments. The computerized method 200 can be executed using, for example, the central server 104 shown in FIG. 1. At step 202, the computing device accesses, from a storage device, a set of disparate images (e.g., independently captured or created images that were not captured or created as part of a video). At step 204, the computing device sorts the set of images using a similarity metric. At step 206, the computing device encodes the sorted set of images using a video codec to obtain a video that encodes the sorted set of images. At step 208, the computing device generates metadata that reflects a correspondence between each of the sorted images and frames in the video.

Referring to step 202, as described herein the images can be screenshots captured by monitoring software. It should be appreciated that while some examples described herein relate to screenshots, the techniques can be used to encode any suitable type of images having any suitable type of content. Each image can be generated separately from other images. For example, each image can be captured based on (e.g., in response to and/or associated with) the performance of an action by a user and/or upon occurrence of a triggering event. Unlike a video-type application that captures successive frames of a scene, the images are captured in response to the occurrence of an action or event at the computing device.

In some embodiments, the central server may receive images from each computing device. As described herein, each image can be associated with contextual information. The contextual information may be stored as part of the image and/or separate from the image. In some embodiments, the file name for each image may include contextual information. For example, each file name may include a timestamp that is associated with the time that the image was captured, data indicative of the computing device that is associated with the image, and/or other information.

In some embodiments, the central server may manage the images for each computing device. For example, the central server may store images for each computing device in a separate folder. Each folder can be associated with a Universally Unique Identifier (UUID) for the computing device (e.g., as specified in RFC 4122, which is hereby incorporated by reference herein in its entirety). For example, each folder name can include the UUID of an associated computing device. In some embodiments, the computing device can sort images for storage into containers.

In some embodiments, the central server can monitor the number of images in each folder and/or in a set of folders to determine when to trigger the encoding process. For example, the central server can use one or more thresholds or other metrics to determine when the central server includes a sufficient number of images to trigger an encoding process. For example, a threshold of 1,000 images, 2,000 images, 5,000 images, and/or some other threshold can be used to trigger the encoding process. The threshold can be applied to one set of images (e.g., images stored in one folder) and/or multiple sets of images. For example, the threshold can be applied to images captured of computing devices performing similar tasks (e.g., based on triggering events, captured computing application, etc.), computing devices at a same location (e.g., physical location, company, etc.), computing devices that capture images at a similar time, and/or the like.

Figure 3:
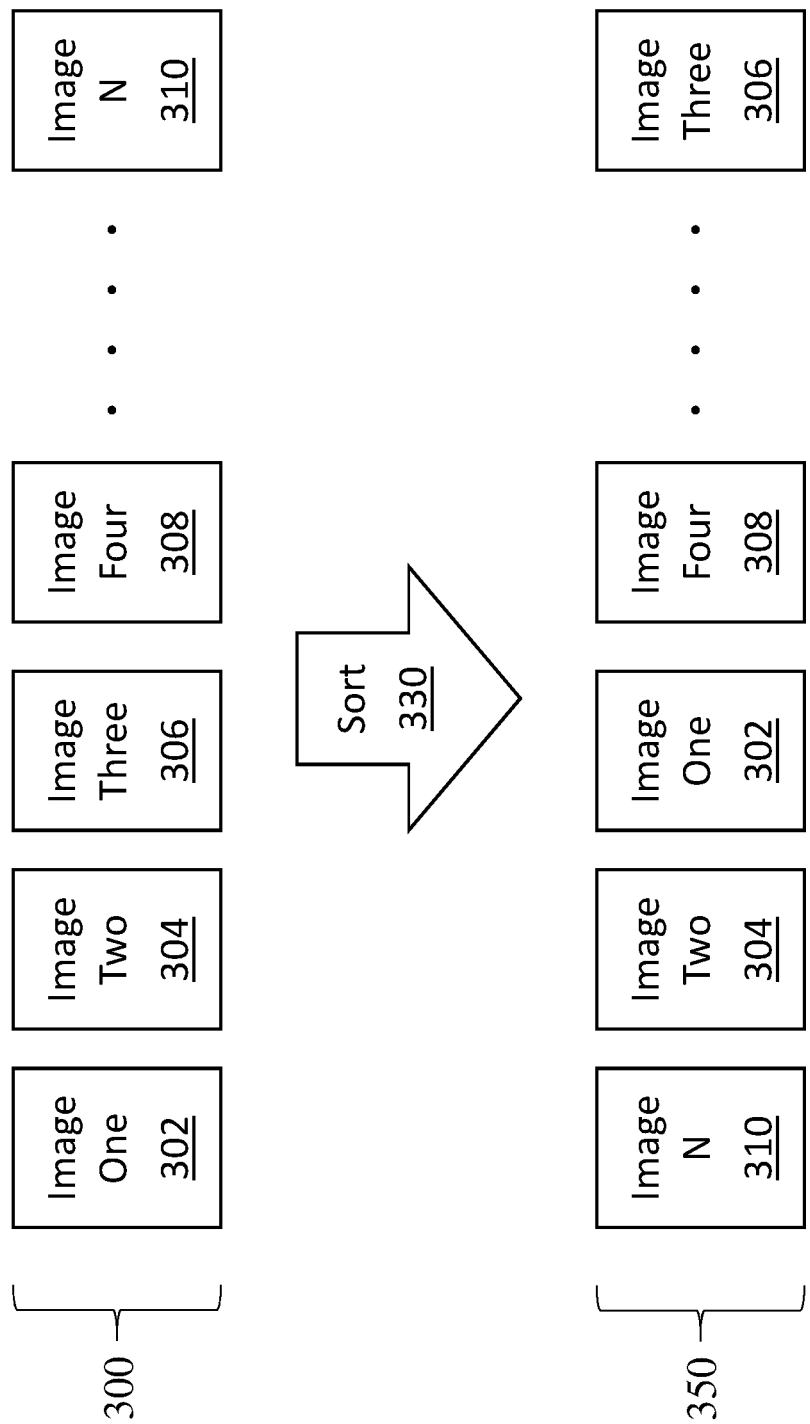
FIG. 3 is a diagram showing an example of sorting images, according to some embodiments of the technology described herein.

At step 204, the computing device sorts the set of images using a similarity metric. The images can be sorted in a manner that groups similar images together (e.g., to improve deduplication and/or compression when encoding the images into a video). FIG. 3 is a diagram showing an example of sorting images, according to some embodiments. The unsorted images 300 include, ordered from the left to the right, image one 302, image two 304, image three 306, image four 308 through image N 310, where N is any positive integer number representative of the total number of unsorted images 300. The order of the unsorted images 300 can be determined based on the time each image was captured, the file names of the images, the time each image was uploaded to the central server (e.g., to a folder associated with the computing device from which the image was generated), contextual information associated with the image, and/or the like.

As represented by arrow 330 in FIG. 3, the unsorted images 300 are sorted to re-order the images into the sorted images 350. The images can be sorted based on image content, which can be done to group similar images together. In some embodiments, the images can be sorted using a similarity metric. Examples of the similarity metric can include using a perceptual hash, computing a mean squares, computing a correlation or normalized correlation, computing a pattern intensity metric, computing mutual information, and/or the like, to identify similar images. For example, a perceptual hash can be used to group together perceptually-similar images. A perceptual hashing algorithm can generate a fingerprint for each image based on the image contents, such that similar images will have similar fingerprints and/or the same fingerprint. Thus, perceptually-similar images should have overlap (e.g., significant overlap) in pixel information. As another example, a mean squares sum can be computed of the squared differences between intensity values to identify images with intensity values in the same and/or a similar range. As a further example, a normalized correlation between intensity values divided by the square rooted autocorrelation of both target and reference objects can be computed to identify images with intensity values related by a linear transformation. As an additional example, a pattern intensity metric can be computed by computing the sum of the squared differences between intensity values transformed by a function of type $1/(1+x)$, which can be used to identify similar images because the metric increases when intensity values are close. As another example, the techniques can include computing mutual information by measuring how much can be known or determined from one image (or set of pixel data) if only the other image (or set) is known. Thus, by using a similarity metric, the video encoding algorithms may therefore better compress the sorted images because the differences between adjacent images is reduced (or minimized) through sorting.

In some embodiments, the images can be grouped into different groups of images, either prior to sorting and/or after sorting the images. For example, the images can be grouped by the computing device that generated the image (e.g., each image can be grouped into a group associated with a specific computing device 102 in FIG. 1). As another example, the images can be grouped based on information associated with the images, such as by the one or more applications captured by the images, the user that was operating the computing device when the image was captured (e.g., since certain users may be known to perform similar procedures for analysis), a time of day when the images were generated, and/or the like. As a further example, the images can be grouped based on a membership metric, such as by computing a Hamming distance, that is used to determine similar images (e.g., which can then, once grouped, be further sorted group-by-group using a similarity metric as described herein). Thus, images can be grouped to associate images with a device or user (e.g., the device or user that generate the image), and/or to further group images in a manner that improves identifying similar images.

Figure 4:
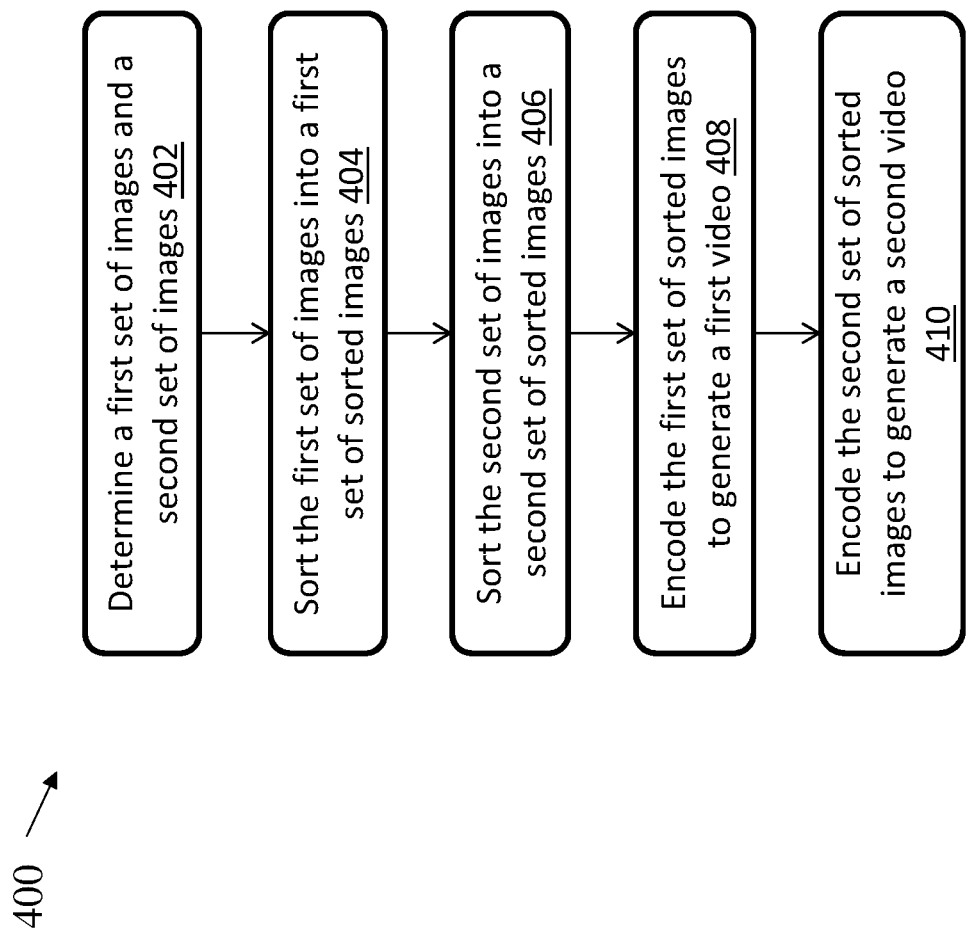
FIG. 4 shows an exemplary computerized process for grouping images, according to some embodiments of the technology described herein.

FIG. 4 shows an example of a computerized process 400 for grouping images, according to some embodiments. The computerized process 400 can be executed by, for example, the central server 104 shown in FIG. 1. At step 402, the computing device determines, e.g., using a membership metric, a first set of images and a second set of images from the set of images. While this example determines two different sets of images, this is for exemplary purposes only, as any number of groups can be determined without departing from the spirit of the techniques disclosed herein. At step 404, the computing device sorts the first set of images using the similarity metric into a first sorted set of images. At step 406, the computing device sorts the second set of images into a second sorted set of images. As described further in conjunction with step 206, at step 408 the computing device encodes the first sorted set of images to generate a first video that encodes the first sorted set of images, and at step 410 the computing device encodes the second sorted set of images to generate a second video that encodes the second sorted set of images. Therefore, the central server can generate different videos for different (related) groups of images.

In some embodiments, the computing device can use one or more data structures to store a set of images (e.g., 1,000 images, 2,000 images, etc.). Referring to FIG. 1, for example, the central server 104 can implement the data structures in the database 108. In some embodiments, a container data structure can be used to store images. Containers can be, for example, a folder, a file, or other types of data structures that can hold a plurality of data items.

In some embodiments, a container can change over time. For example, initially a container can be a folder that is used to generate and/or store a set of images for encoding. Once the container is triggered for compression, the container can be converted into a single file, namely an encoded video stream as described herein. In some embodiments, each container can reference a single video (e.g., generated in step 206) that contains some number of frames corresponding to original images inserted into the system. Containers may be constructed across distributed nodes, such as across nodes of a distributed blob store.

In some embodiments, each container can be associated with an identifier, such as a UUID. For example, in some embodiments the containers can be named by UUID. Using an identifier can avoid lock contention for the database(s) implementing the containers, which can be a costly operation. For example, locks can be avoided when using UUID identifiers because the computing device implementing the database need not depend on any shared states to identify new containers (e.g., such as a counter value to allocate the next number for a container). The central server can maintain a mapping between each container UUID and container file name in a database. For example, the central server can maintain metadata in the metadata database 110, which can be stored on disk and/or within a distributed file or block storage layer. As described further herein, the database can track the status of each container, such as whether each container is active or has been deleted (e.g., for garbage collection purposes).

In some embodiments, clusters can be used to group containers that hold similar images. Clusters can include, for example, containers with images that are within a certain metric, such as within a Hamming Distance (e.g., which measures the number of similarities and/or differences). Clusters can be used to constrain the overall set of images being processed for encoding to a smaller, related subset. Containers can then be operated on wholesale with batch retrieval of all images inside of them, versus individually retrieving each image one at a time.

In some embodiments, as described herein, different sets of images can be determined and/or sorted based on one or more aspects of the images, such as by using a similarity metric (e.g., to sort images), a membership metric (e.g., to determine groups of images), comparing contextual information associated with the images, comparing the file names of the images, and/or the like. Containers can hold large numbers of images, and clusters can include any number of containers. Therefore, clusters can be associated with large numbers of images (e.g., millions of images). In some embodiments, given the similarities among images in each container and/or a cluster of containers, in order to search for a particular image, the computing device can use membership testing techniques to determine whether an image is likely in a container and/or cluster. For example, the computing device can use Bloom filters and/or other membership tests, such as other probabilistic set membership tests and/or data structures, to perform approximate membership tests for images in a container or cluster. The computing device can use various aspects of the images to search for images and/or to narrow the scope of a search for an image, such as by using a perceptual hash, the image's original file name, contextual information associated with the image, and/or the like. For example, similar images will likely collide in the perceptual hash space, and therefore nearest neighbor searches can be constrained to a cluster. In some embodiments, nearest neighbor searches can be run using in-memory indexes based on Bloom filters.

In some embodiments, the computing device processes each received image to store the image. Referring to FIG. 1, for example, the central monitoring service 103 of the central server 104 receives an image from a computing device 102 and processes the image to store the image in the database 110. In some embodiments, the central controller communicates with each computing device through an API. The computing devices can send images to the central server using the API. The central server can queue images received through the API for further processing. The central server can write queued images to storage, such as the image database 108 shown in FIG. 1. In some embodiments, the central server writes queued images to a distributed storage, such as a distributed blob store.

In some embodiments, the central server processes each image to insert the image into a container, which can be stored in the image database. The central server can add images into containers that can still accept images. For example, the central server can add images to open containers. In some embodiments, an open container is a container that stores images that have not yet been encoded into a video. The central server can insert additional images into an open container prior to the container being encoded. Once encoded, the container can be updated (e.g., by updating metadata associated with the container) to no longer be an open container. In some embodiments, an open container can include already-encoded video, and the system can encode newly-added images. For example, the central server can encode new images and appended the newly encoded images to the existing encoded video. The central server can maintain metadata to determine when such a container can no longer accept additional images (e.g., an image count of encoded images, a size of the encoded video, and/or the like). Once the central server determines the container is no longer open, the central server can update the container to no longer be an open container.

In some embodiments, as described herein, the central server can perceptually hash the image retrieved from storage to determine the container into which to place the image. In some embodiments, for example, the central server can determine the Hamming Distance to existing containers, such as by computing the Hamming Distance to the last inserted image of each open container, to a representative image of each open container, and/or to a set of images from each container. For example, the central server can add the image to an existing open container if the central server determines that the Hamming Distance to the last inserted image of the container is sufficient to insert the image into the existing container (e.g., if the Hamming Distance is less than a threshold value). As another example, the central server can add the image to a new container if the central server determines the Hamming Distance to the last inserted image for each container is not sufficient to insert the image into an existing container (e.g., if the central server determines that there are no appropriate open containers, ordered immediately after its nearest neighbor by Hamming Distance within the container).

In some embodiments, the central server can create and/or add metadata for each image to the central server database. For example, the central server can keep track of the container that stores each image. The central server can store, for each image, the UUID of the container, the order of the image in the container, the original file name of the image, user metadata (e.g., an identifier for the user or computing device from which the image was received), a deletion status (e.g., initially, the deletion status can be set to false), and/or other information maintained for each image. For example, after sorting images, the stored metadata can include a counter value that can be used to determine the frame number for each image inside the container (e.g., the order of the images in the container), as well as the original file name of each image. Once such metadata is stored, the sorted images can be renamed based on the counter value, such as by changing the file name to the counter value. Encoders can then encode the sorted images in the order indicated based on their counter value.

In some embodiments, the central server can perform multiple levels of sorting. For example, the computing device can sort images into containers as described herein. In some embodiments, the central sever can further sort images in multiple containers, such as containers in the same cluster. For example, the system can use different containers for different users and/or computing devices, such that images generated by one computing device are stored in a container associated with that computing device, while images generated by another computing device are stored in a different container associated with the other computing device. The computing device can be configured to sort images from both containers and to generate a video that includes the images from the containers.

Referring to step 206, the computing device encodes the sorted set of images using a video codec to encode the sorted set of images into a video. Any type of video encoding algorithm can be used to implement the techniques described herein, such as H.263, H.264/MPEG-4 AVC, H.265 (HEVC), and AV1. In some embodiments, one or more parameters of the video encoding algorithm, such as compression parameters and/or consolidation factors, can be determined by analyzing the parameters based on sets of images and/or the monitoring environment. In some embodiments, the computing device encodes and/or stores the sorted set of images as a video file, such as an MPEG-4 (MP4) file, an Audio Video Interleave (AVI) file, a Matroska Video (MKV) file, and/or the like. In some embodiments, the computing device encodes the video data and metadata into a file or one or more files. For example, a file format can be used and/or created that stores the video in conjunction with the metadata described herein (e.g., metadata that identifies, for each image stored in the video, a portion of the data within the video data that can be used to decode the image from the video).

In some embodiments, statistical techniques can be used to determine an optimal set of parameters for the video encoding algorithm. For example, the set of parameters can be formulated as a convex optimization problem that can be solved using linear programming techniques (e.g., using the simplex algorithm). Target image workloads can be run with different video encoding algorithms, different compression parameters for those algorithms, and/or different consolidation factors until reaching a maximum compression with minimized latency increase and accuracy loss for the target workloads (e.g., specified as a global maximum). In some embodiments, parameters that can be specified can include desired latency, desired accuracy, desired ingest rate, and/or desired timeframe of ingest (e.g., weeks, months, years). The system can be configured to self-tune the video codec after searching the parameter space for optimal values.

In some embodiments, the central server can schedule sets of images (e.g., containers of images) for encryption. For example, the central server can monitor the number of images in each container. If the number of images in a container reaches a metric (e.g., a threshold number of images), the central server can schedule the container for encoding and encryption into a video stream. For example, if the central server is adding an image to a container that causes the container to hit a threshold number of images, the central server can schedule the container for encryption.

In some embodiments, once the video stream is generated, the central server can store the resulting video in the distributed storage, such as in the image database. In some embodiments, the central server can name the video (e.g., video file) based on the UUID of the container. In some embodiments, the central server can generate a folder for each video, and name the folder based on the UUID of the container. As described herein, a distributed blob store can be used to store the videos, which can spread writes out across multiple servers, and can include replication for fault tolerance. In some embodiments, once an image is encoded into a video stream (e.g., including encoding, encryption, and completion of metadata transactions), the central server can delete the original images.

Figure 5:
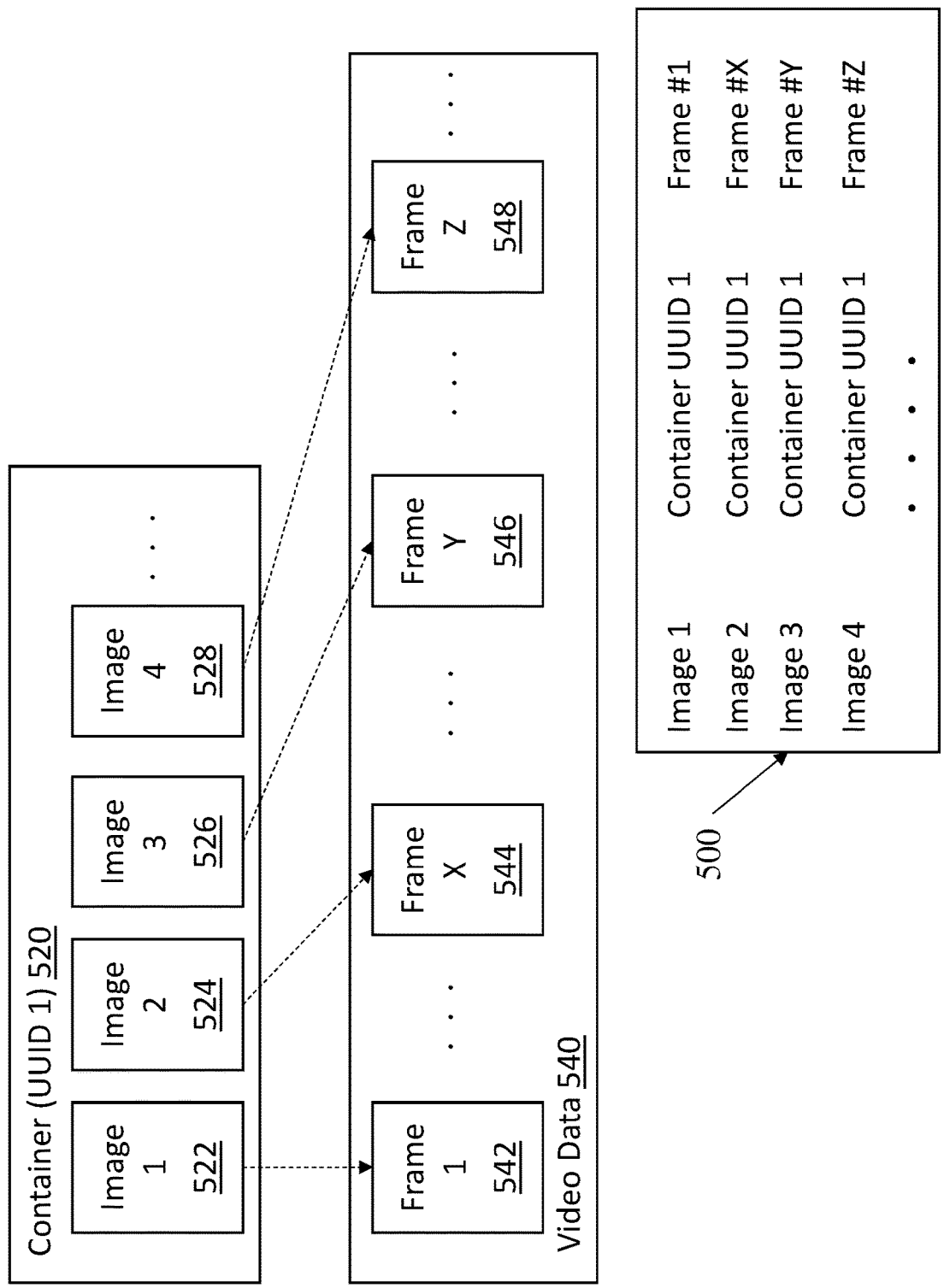
FIG. 5 shows exemplary image metadata, according to some embodiments of the technology described herein.

Referring to step 208, the computing device can generate metadata for each image. The metadata can include, for example, the container into which the image is stored, encoding information (e.g., a frame number), encryption information, and/or the like. FIG. 5 shows exemplary image metadata 500, according to some embodiments. Container 520 has a UUID of 1, and includes image one 522, image two 524, image three 526, image four 528, and so on.

As described herein, the container 520 can be encrypted and/or encoded into the video 540, which includes a series of frames including frame one 542, frame X, 544, frame Y 546, frame Z 548, and so on. Containers can be encrypted to protect the contents of the images in the container. For example, each container can be associated with a list of encryption keys (e.g., stored in a secret store/keychain) and the encryption algorithm used to encrypt the container. For example, AES can be used for encryption. One or more of the different AES key sizes of 128, 192 and/or 256 bits, to implement block-level encryption. Keys from the list of encryption keys can be used to encrypt and decrypt chunks of the video stream at associated boundaries of the video stream. One or more of the different AES modes can be used for encryption, such as Galois/Counter Mode (GCM), Xor-encrypt-xor (XEX)-based tweaked-codebook mode with ciphertext stealing (XTS), or other modes. For example, in some embodiments, XTS can be used for encryption, such as for block-level encryption. In some embodiments, the video stream can be encrypted and decrypted at frame boundaries, such as I-frame boundaries as described further herein.

As shown by the dotted lines, each image in the container 520 can be associated with one or more frames in the video data 540. In some embodiments, as described herein, each image can be associated with the preceding I-frame, since I-frames are encoded without reference to other frames in the video file and can therefore serve as anchors into the video file. Frames following the I-frames, such as P-frames (e.g., which are predicted based on a single preceding reference frame, or I-frame) and/or B-frames (e.g., which are predicted based on a preceding and succeeding reference frame), may use other frames for reconstruction and therefore may not be independent. Therefore, while such P-frames and/or B-frames may also be read to decode an image from a video file, such frames may not be used as an anchor into the video file. In some embodiments, the metadata and/or other data required to initialize the decoder may be included in a first chunk of a movie file. For example, frame one 542, frame X 544, frame Y 546, frame Z 548 can be the I-frames in the video data 540 that each precede image one 522, image two 524, image three 526, image four 528, respectively. The metadata 500 can include, for each image stored by the central server, an association between the file name of the image (e.g., Image 1, Image 2, Image 3, etc. for simplicity in this example), the container UUID into which the image was stored (e.g., UUID #1, for simplicity in this example) and a corresponding frame in the video file (e.g., Frame #1, etc., for simplicity in this example).

While steps 206 and 208 are shown as separate steps in method 200, the techniques can generate the metadata prior to, and/or in conjunction with, the image encoding process. For example, the central server can create an initial record for an image in the database when the central server adds the image to a container (e.g., such that the initial record includes the file name and the container UUID). During and/or after creation of the video file that includes the image, the central server can update the record for the image to include the frame number (e.g., for the associate frame to begin reading from in the video file in order to decode the image).

The image numbers, frame numbers, ordering of the images in the container 520, ordering of the frames in the video data 540, ordering of the metadata entries in the metadata 500, and the associations of the images to frame numbers are for exemplary purposes only, and are not intended to be limiting. For example, while the metadata entries in metadata 500 are in the same order as the images in the container 520, the metadata entries in metadata 500 can be created in any order, such as in order as the central server receives images from computing device, queues images for processing, adds images to storage, and/or the like. As another example, while the images in container 520 are associated with frames in the video data 540 such that subsequent images are associated with subsequent frames, an image can be associated with an earlier frame (e.g., image three 526 can be associated with a frame earlier than frame X 544).

In some embodiments, one or more aspects of the image storage and/or encoding process can be performed in volatile memory. The central server can leverage volatile memory to increase the speed of the image encoding process (and/or retrieval process, as described herein). For example, one or more containers can be managed in volatile memory. As another example, some or all of the encoding process can be performed in volatile memory.

Figure 6:
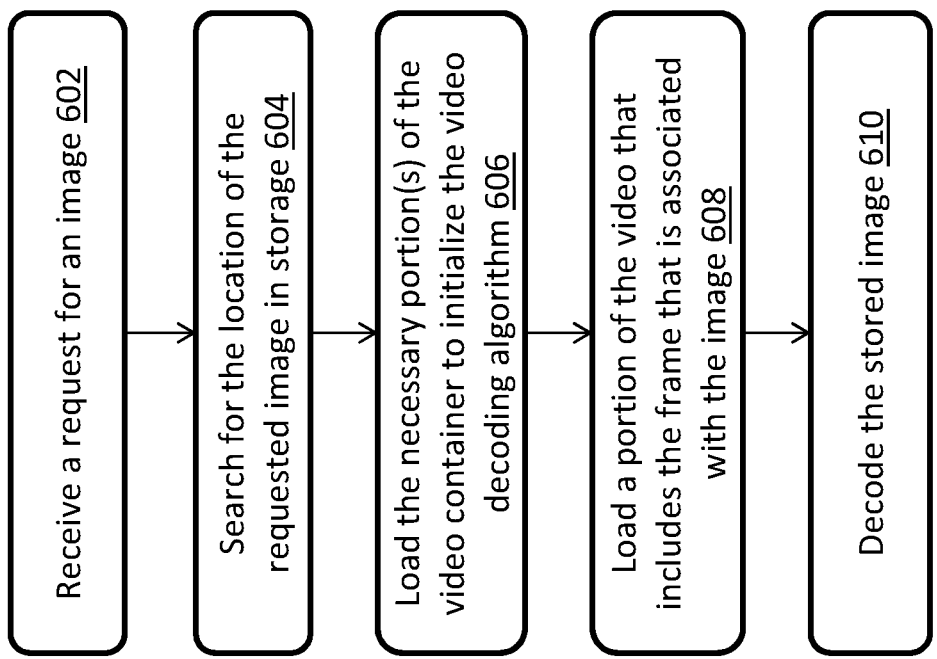
FIG. 6 shows an exemplary computerized process for retrieving an image, according to some embodiments of the technology described herein.

The central server can be configured to retrieve images from the videos. FIG. 6 shows an exemplary computerized method 600 for retrieving an image, according to some embodiments. At step 602, the central server receives a request for an image and/or a list of requested images. For example, the central server can receive the file name of the image being requested from storage, a timestamp of when the image was generated, and/or the like.

At step 604, the central server searches for the location of the requested image in storage. For example, the central server can search for the file name of the requested image to locate a cluster that may include the image (e.g., using Bloom filters and/or other membership tests, which may or may not be probabilistic). The central server can further search within the cluster for the container that includes the image. For example, the server can perform a constrained index search within the metadata database to find the container (e.g., the video data or video file) and frame within the video that matches the requested file name. Ultimately, the central server determines, based on the original requested file name, which video container the image is within.

At step 606, the central server can load the necessary portion(s) of the video container to initialize the video decoding algorithm. For example, the central server can load an initial portion of the container from the image database. In some embodiments, if the video is encrypted, the central sever can decrypt the initial portion of the container. The central server initializes the video decoding algorithm with the initial portion of the container.

At step 608, the central server loads a portion of the video data that includes the frame that is associated with the image, along with additional frame(s). For example, as described herein, in some embodiments the central server can load a corresponding portion of the video data that begins with the I-frame identified in the container for the image. If the video data is encrypted, the central server can decrypt the loaded portion of the video.

In some embodiments, the search process can be configured to only perform a minimum number of database accesses to obtain the necessary data from the video. In some embodiments, the central server can load the portion of the video loaded in step 608 in conjunction with the portion loaded in step 606 to initialize the video decoding algorithm. The image retrieval process can be limited to two data requests, which can include a first request to access the metadata in step 602 to determine the video container that stores the image, and a second request to load video data. The central server can be configured to maintain a portion of the metadata in memory, as well as portions of video data, which can speed-up image retrievals. In some embodiments, enough information can be cached (e.g., including OS-level file system caches) in main memory of the computing device to require only two file system read operations from disk to retrieve any single image in the system.

At step 610, the central server decodes the stored image. In some embodiments, the central server uses the video decoding algorithm to seek to the frame associated with the image, and decodes the raw pixel data of the image. For example, the central server retrieves the associated I-frame (and any other necessary frames) and decodes the frame(s) to determine the raw pixel data of the image. The central server can convert the raw pixel data into a format that encodes the raw pixel data, such as into a format requested and/or expected by a requesting device. For example, the computing device can encode the raw pixel data for the image into an image-based file (e.g., PNG, TIFF, JPEG, BMP, and/or the like).

In some embodiments, if a request includes requests for multiple files, the central server can perform a batch retrieval process that is designed to open each container and decode all requested images in the container to avoid needing to perform multiple open processes for the same container. In some examples, the requested files can be specified using a range and/or other indication or metric that encompasses multiple files. For example, a group of files can be requested by requesting a time range of images (e.g., based on time-stamp, such as by requesting images within a timestamp range and or date range).

In some embodiments, the batch image retrieval process can include similar steps as those described in conjunction with FIG. 6, with modifications to batch-retrieve images from disk in an optimal manner. For example, at step 604, the location of each requested image can be determined in order to guide the retrieval process. Regarding steps 606 and/or 608, the central server can be configured to perform an iterative sorting process to determine the order in which to retrieve the images from disk. In some embodiments, the central server can be configured to sort the images for retrieval in a manner that can leverage the use of intermediate caches. For example, the central server can sort the images for retrieval based on the number of requested image per container (e.g., such that containers with more requested images are ordered before containers with fewer images), the frame(s) within each container, or some combination thereof. Referring to step 608, the central server can be configured to read as much data as possible from the container (e.g., the maximum amount of data allowed for the read, the maximum amount of data that can be stored in memory, etc.).

In some embodiments, the central server can be configured to delete images and/or containers. In some embodiments, the central server can be configured to immediately delete an image upon request. However, immediate deletion may slow down other operations (e.g., image insertions and/or retrievals), and therefore may cause inefficiencies. In some embodiments, the central server can use a garbage collection process to asynchronously clean-up larger video containers. Garbage collection can mark images for deletion, and can wait to perform the actual deletion. By waiting to perform the deletions, the system can coordinate deleting images in a way that minimizes impact, such as by waiting to run the garbage collection process until system down-time or during times of the day with a low load on the system.

In some embodiments, the central server can mark images for deletion. For example, upon receipt of a request to delete an image, the central server can look-up the image to determine the location of the image (e.g., based on the image's filename within the database index, as described in conjunction with step 604). The central server can update the metadata associated with the image to mark the image for garbage collection (e.g., by setting a flag, such as by setting a delete Boolean to true).

In some embodiments, the central server can perform a compaction operation to remove deleted images from a video container. For example, the central server can periodically execute a compaction sweep. The central server can use a schedule to determine when to execute the compaction sweep, such as a cron or other time-based scheduler on UNIX-like systems. The system can run sweeps during a predicted minimum period of system activity (e.g., during the evening). The compaction process can run for a predetermined time period, such as 1-2 hours, the duration of the period of system activity, and/or the like. The central server can query the metadata database to select all images marked for deletion. The central server can group the images, such as by container. The central server can sort the containers with images marked for deletion, such as prioritizing containers with more images than containers with fewer images. The central server can compact the containers in sorted order. Once the compaction time slot ends, the central server can allow any running compaction jobs to finish, but will not compact any new containers. In some embodiments, compaction jobs can be asynchronously submitted to a job queue and can run concurrently on multiple nodes.

In some embodiments, to compact a video container, the central server can create a new container with a new UUID mapping in the container mapping table. The central server can decode the video container being compacted using the video decoder algorithm. For each frame, the central server can re-encode the frame into a new container if the frame is not marked for deletion (e.g., if a delete flag is set to false). The central server can re-encrypt the video container, if applicable (e.g., using new encryption keys, if the container keys need to be rotated). The system can be configured to merge containers to maintain a minimum number of images in each video container. For example, if the minimum number of images is N, if the number of images in a video container falls under N/2 images, the central server can merge the container with another container (e.g., in the same cluster of images). For example, the central server can merge the container with another container that also has fewer than N/2 images, and that is also in the same cluster of images. Once the new container is completed, including any necessary database transactions, the central server can delete the original old container from disk.

In some embodiments, compaction can be used to improve video coding. For example, compaction can re-order the images in a cluster (e.g., to re-optimize inter-image deduplication and compression). For example, the central server can sort all images in the oldest non-optimized cluster by Hamming Distance. If the re-computed distance from the sorted ordering to the current ordering in the containers is beyond a threshold (e.g., the threshold number of images used to trigger encoding/2), then the central server can compact all containers of the cluster by re-organizing images into the newly computed optimal ordering. The central server can update all appropriate metadata tables to refer to the new containers, and delete old containers. The central server can, for example, update the metadata image mappings to refer to the new video container and frame inside of that container. In some embodiments, compaction for optimization can be scheduled for execution at the same time as compaction for garbage collection.

An illustrative implementation of a computer system 700 that may be used in connection with any of the embodiments of the disclosure provided herein is shown in FIG. 7. For example, the computer system 700 can be used for the computing device 102 and/or the central server 104. The computer system 700 may include one or more computer hardware processors 702 and one or more articles of manufacture that comprise non-transitory computer-readable storage media (e.g., memory 704 and one or more non-volatile storage devices 706). The processor 702(*s*) may control writing data to and reading data from the memory 704 and the non-volatile storage device(s) 706 in any suitable manner. To perform any of the functionality described herein, the processor(s) 702 may execute one or more processor-executable instructions stored in one or more non-transitory computer-readable storage media (e.g., the memory 704), which may serve as non-transitory computer-readable storage media storing processor-executable instructions for execution by the processor(s) 702.

The computer system 700 can be any type of computing device with a processor 702, memory 704, and non-volatile storage device 706. For example, the computer system 700 can be a server, desktop computer, a laptop, a tablet, or a smartphone. In some embodiments, the computer system 700 can be implemented using a plurality of computing devices, such as a cluster of computing devices, virtual computing devices, and/or cloud computing devices.

The terms "program" or "software" are used herein in a generic sense to refer to any type of computer code or set of processor-executable instructions that can be employed to program a computer or other processor (physical or virtual) to implement various aspects of embodiments as described above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. At least one computer readable storage medium storing processor-executable instructions that, when executed by at least one processor, cause the at least one processor to perform:
   accessing, from a storage device, a first set of images, each image of the first set of images containing at least a part of a screenshot of a display of a computing device used by a user;
   sorting the first set of images using a similarity metric to obtain a sorted set of images;
   encoding the sorted set of images using a video codec to obtain a video encoding the sorted set of images in a series of frames; and
   storing the video in conjunction with metadata, wherein:
      the metadata includes information that indicates an association between the series of frames in the video obtained by encoding the sorted set of images and images in the first set of images that existed in an initial order prior to the first set of images being sorted using the similarity metric to obtain the sorted set of images, and
      the information indicates, for each image in the first set of images, an association between the image and a corresponding frame in the series of frames in the video.

2. The at least one computer readable storage medium of claim 1, further configured to cause the at least one processor to:
   access, from the storage device, a second set of images, each of the images in the second set of images containing at least a part of a screenshot of a second display of a second computing device used by a second user, wherein the sorting comprises:
      sorting a union of the first set of images and the second set of images to obtain the sorted set of images.

3. The at least one computer readable storage medium of claim 1, wherein each image in the first set of images is stored in an associated image file having an identifier indicating a time at which the image was captured.

4. The at least one computer readable storage medium of claim 1, wherein sorting the first set of images comprises:
   determining, using a membership metric, a first plurality of images and a second plurality of images from the first set of images;
   sorting the first plurality of images using the similarity metric into a first sorted set of images;
   sorting the second plurality of images using the similarity metric into a second sorted set of images; and
   encoding the sorted set of images comprises:
      encoding the first sorted set of images using the video codec to obtain a first video encoding the first sorted set of images; and
      encoding the second sorted set of images using the video codec to obtain a second video encoding the second sorted set of images.

5. The at least one computer readable storage medium of claim 4, wherein determining the first plurality of images and the second plurality of images using the membership metric comprises determining the first plurality of images and the second plurality of images based on a) the similarity metric, b) a file name of each image in the first set of images, or both.

6. The at least one computer readable storage medium of claim 1, wherein sorting the first set of images comprises:
   generating, for each image of the first set of images, a fingerprint using a perceptual hash algorithm; and
   sorting the first set of images based on the fingerprint of each image.

7. The at least one computer readable storage medium of claim 1, wherein storing the video in conjunction with the metadata further comprises:
   storing the video in conjunction with the metadata comprising, for each image in the first set of images, information indicating an association between a file name of the image and the corresponding frame in the series of frames in the video.

8. The at least one computer readable storage medium of claim 1, wherein the processor-executable instructions further cause the at least one processor to generate the metadata.

9. The at least one computer readable storage medium of claim 1, wherein the processor-executable instructions further cause the at least one processor to:
   receive a request to access an image encoded in the video;
   determine, based on the metadata, a location in the video associated with the requested image; and
   extract, from one or more frames at the location in the video, the requested image.

10. The at least one computer readable storage medium of claim 9, wherein receiving the request comprises receiving a file name of the image, a timestamp associated with the image, or some combination thereof.

11. The at least one computer readable storage medium of claim 9, wherein the extracting comprises:
    loading an initial portion of the video to initialize the video codec for the video;
    loading the one or more frames at the location in the video; and
    decoding, using the video codec, the requested image based on the loaded one or more frames.

12. A system, comprising:
    at least one hardware processor; and at least one non-transitory computer-readable storage medium storing processor-executable instructions that, when executed by the at least one hardware processor, cause the at least one hardware processor to perform:
  accessing, from a storage device, a first set of images, each image of the first set of images containing at least a part of a screenshot of a display of a computing device used by a user;
  sorting the first set of images using a similarity metric to obtain a sorted set of images;
  encoding the sorted set of images using a video codec to obtain a video encoding the sorted set of images in a series of frames; and
  storing the video in conjunction with metadata, wherein:
    the metadata includes information that indicates an association between the series of frames in the video obtained by encoding the sorted set of images and images in the first set of images that existed in an initial order prior to the first set of images being sorted using the similarity metric to obtain the sorted set of images, and
    the information indicates, for each image in the first set of images, an association between the image and a corresponding frame in the series of frames in the video.

13. The system of claim 12, wherein the processor-executable instructions further cause the at least one hardware processor to:
  access, from the storage device, a second set of images, each of the images in the second set of images containing at least a part of a screenshot of a second display of a second computing device used by a second user, wherein the sorting comprises:
    sorting a union of the first set of images and the second set of images to obtain the sorted set of images.

14. The system of claim 12, wherein each image in the first set of images is stored in an associated image file having an identifier indicating a time at which the image was captured.

15. The system of claim 12, wherein sorting the first set of images comprises:
  determining, using a membership metric, a first plurality of images and a second plurality of images from the first set of images;
  sorting the first plurality of images using the similarity metric into a first sorted set of images;
  sorting the second plurality of images using the similarity metric into a second sorted set of images; and
  encoding the sorted set of images comprises:
    encoding the first sorted set of images using the video codec to obtain a first video encoding the first sorted set of images; and
    encoding the second sorted set of images using the video codec to obtain a second video encoding the second sorted set of images.

16. The system of claim 15, wherein determining the first plurality of images and the second plurality of images using the membership metric comprises determining the first plurality of images and the second plurality of images based on a) the similarity metric, b) a file name of each image in the first set of images, or both.

17. The system of claim 12, wherein sorting the first set of images comprises:
  generating, for each image of the first set of images, a fingerprint using a perceptual hash algorithm; and
  sorting the first set of images based on the fingerprint of each image.

18. The system of claim 12, wherein storing the video in conjunction with the metadata further comprises:
  storing the video in conjunction with the metadata comprising, for each image in the first set of images, information indicating an association between a file name of the image and the corresponding frame in the series of frames in the video.

19. The system of claim 12, wherein the processor-executable instructions further cause the at least one hardware processor to:
  receive a request to access an image encoded in the video;
  determine, based on the metadata, a location in the video associated with the requested image; and
  extract, from one or more frames at the location in the video, the requested image.

20. A method, performed by a computing device, the method comprising:
  accessing, from a storage device, a first set of images, each image of the first set of images containing at least a part of a screenshot of a display of a computing device used by a user;
  sorting the first set of images using a similarity metric to obtain a sorted set of images;
  encoding the sorted set of images using a video codec to obtain a video encoding the sorted set of images in a series of frames; and
  storing the video in conjunction with metadata, wherein:
    the metadata includes information that indicates an association between the series of frames in the video obtained by encoding the sorted set of images and images in the first set of images that existed in an initial order prior to the first set of images being sorted using the similarity metric to obtain the sorted set of images, and
    the information indicates, for each image in the first set of images, an association between the image and a corresponding frame in the series of frames in the video.

* * * * *